Sept. 20, 1938. H. J. McC. BURDICK 2,130,611
VALVE
Filed March 24, 1936 3 Sheets-Sheet 1
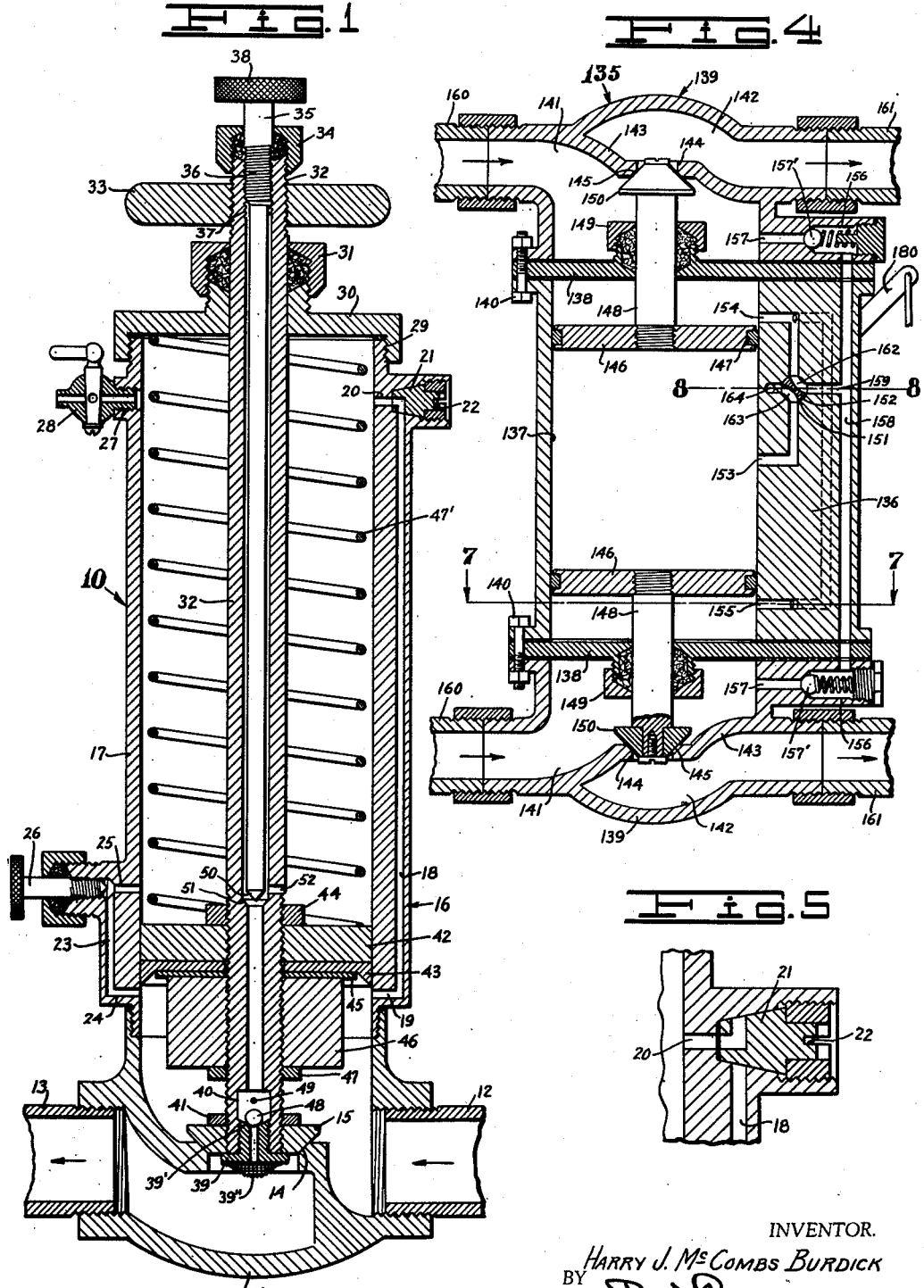
INVENTOR.
HARRY J. McCOMBS BURDICK
BY
ATTORNEY.

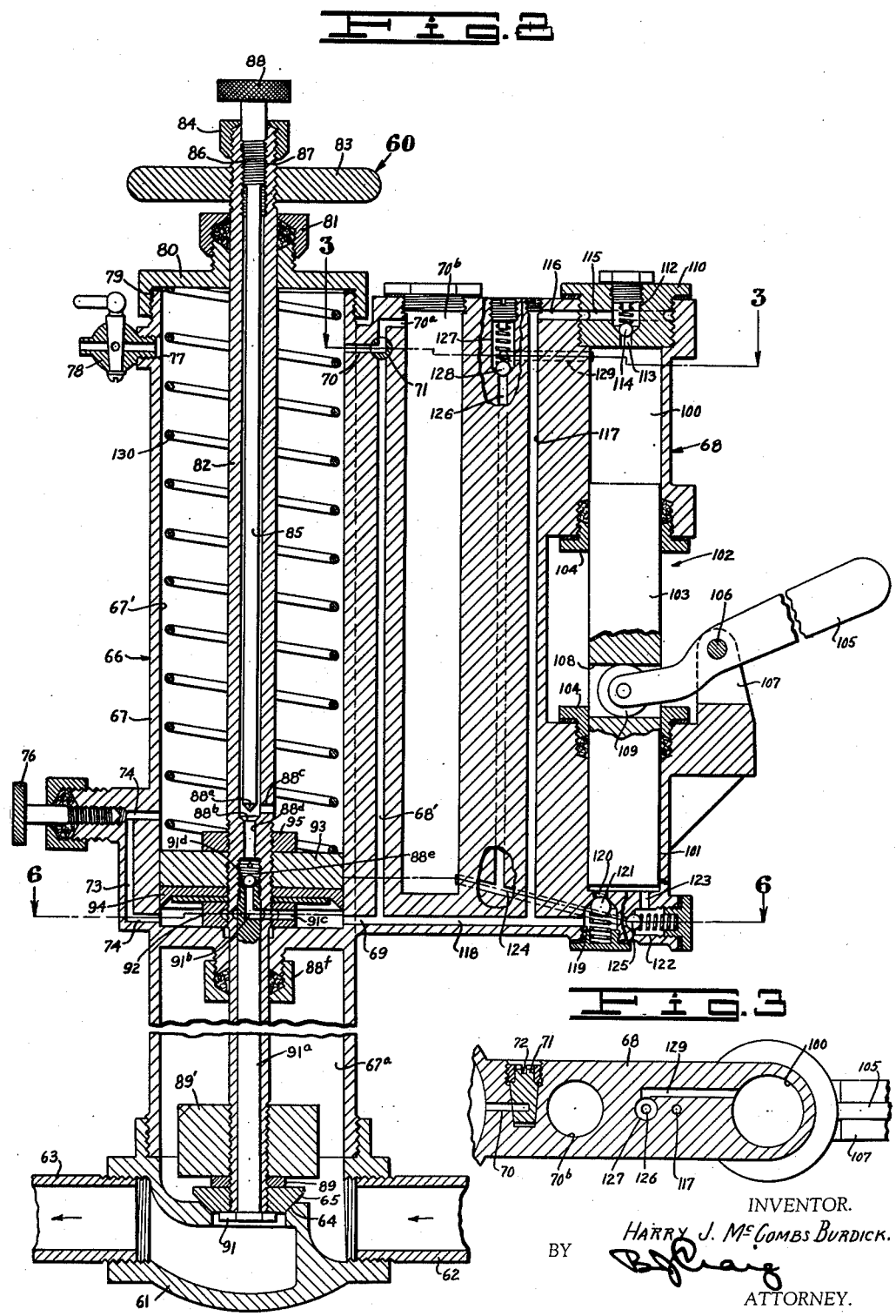

Sept. 20, 1938.   H. J. McC. BURDICK   2,130,611
VALVE
Filed March 24, 1936   3 Sheets-Sheet 3
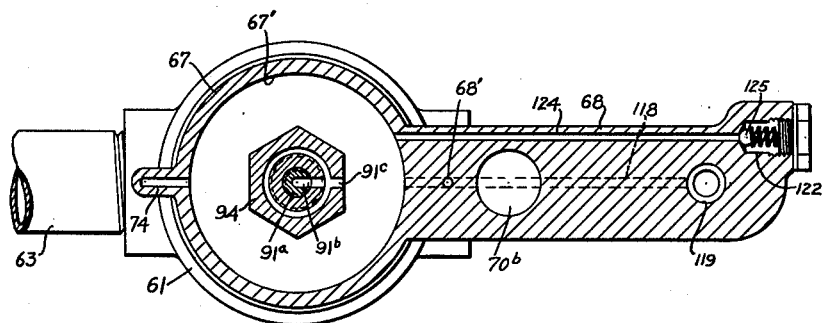
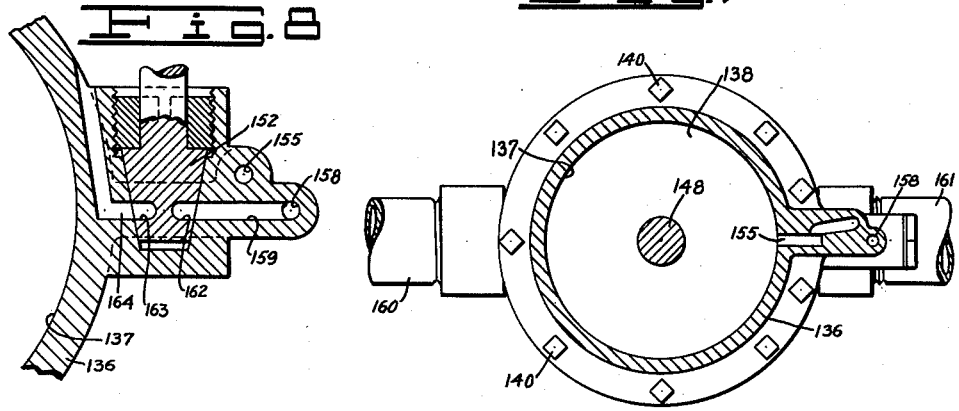
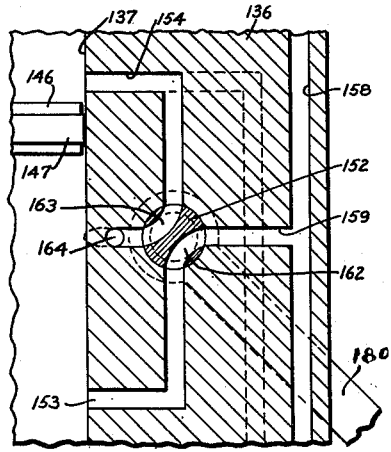
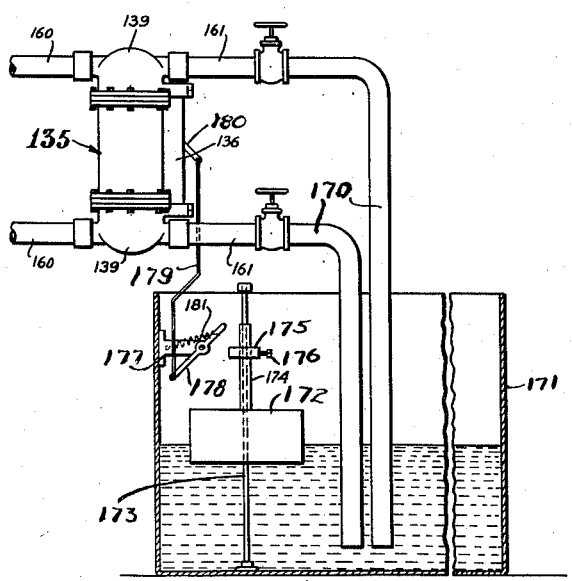
INVENTOR.
HARRY J. McCOMBS BURDICK
BY
ATTORNEY.

Patented Sept. 20, 1938

2,130,611

UNITED STATES PATENT OFFICE 2,130,611

VALVE

Harry J. McCombs Burdick, Anaheim, Calif.

Application March 24, 1936, Serial No. 70,639

11 Claims. (Cl. 137—139)

... ...ion relates to fluid control devices.

The general object of the invention is to provide a device which is adapted to automatically control the flow of fluid.

A more specific object of the invention is to provide a fluid control device including a valve member with novel means for operating the valve to open and closed position.

Another object of the invention is to provide a valve device including a cylinder with piston means in the cylinder and wherein the walls of the cylinder are provided with passages which aid in controlling the movement of the piston.

A more specific object of the invention is to provide valve means for insertion in a fluid pipe system wherein the fluid in the pipe serves to operate the valve.

Another object of the invention is to provide a valve device for controlling the flow of fluid through a pipe and wherein there is provided fluid means independent of fluid in the pipe for operating the valve.

An additional object of the invention is to provide a fluid operated valve mechanism adapted to simultaneously control the passage of fluid through a plurality of pipes.

Other objects and the advantages of the invention will be apparent from the following description taken in connection with the accompanying drawings, wherein:

Fig. 1 is a central, sectional view through a valve device embodying the features of my invention;

Fig. 2 is a view similar to Fig. 1 showing a slight modification;

Fig. 3 is a fragmentary, section in detail taken on line 3—3 of Fig. 2;

Fig. 4 is a central, sectional view through a further modification of my invention;

Fig. 5 is an enlarged, fragmentary, sectional view showing one of the valves;

Fig. 6 is a section taken on line 6—6 of Fig. 2;

Fig. 7 is a section taken on line 7—7 of Fig. 4;

Fig. 8 is a section taken on line 8—8 of Fig. 4;

Fig. 9 is a fragmentary, sectional view on an enlarged scale showing the valve mechanism in the wall of the cylinder in the device shown in Fig. 4; and Fig. 10 is an elevation, partly in section, showing the device of Fig. 4 operatively installed.

Referring to the drawings by reference characters I have shown my invention as embodied in a valve device which is indicated generally at 10. As shown the device includes a fitting 11 which is threaded to receive an inlet pipe 12 and an outlet pipe 13. The fitting is provided with a valve seat 14 on which a valve 15 is seated.

The fitting 11 is threadedly connected to a housing indicated generally at 16 as comprising a cylinder 17 the wall of which on one side has a passageway 18 communicating at its lower end through a passageway 19 with the interior of the cylinder and at the top communicating through a passageway 20 with the interior of the cylinder. Communication between the passageways 18 and 20 is controlled by a valve 21 which may be operated by a screw driver inserted in the slotted end 22.

At its lower end and opposite the passageway 18 the wall of the cylinder is provided with a second passageway 23 one end of which communicates at 24 with the interior of the cylinder, while the other end communicates at 25 with the interior of the cylinder.

A needle valve 26 serves to control the passage of fluid through the passageway 23 which is shown as much shorter than the passageway 18 as will be apparent from the drawings.

Substantially opposite to the passageway 20 I provide an aperture 27 which is threaded to receive a stop-cock 28 to control the passage of fluid through the aperture.

The upper end of the cylinder is threaded as at 29 to receive a closure 30 in which a packing gland 31 is threaded. A hollow plunger rod 32 passes through the packing gland 31 and is provided with a threaded upper end 32 on which a hand wheel 33 is mounted. Beyond the hand wheel is a packing gland 34. The interior of the hollow plunger rod receives a stem 35 which includes a threaded portion 36 which engages with the threaded interior portion 37. The upper end of the stem 35 is provided with a knurled head 38.

At its lower end the plunger rod threadedly receives the valve 15 which is engaged between a flange on a valve member 39, threaded into a valve chamber 40 in the lower end of the plunger rod, and a nut 41 threadedly engaged on the lower end of the plunger rod.

A piston 42 and a leather washer 43 surrounds the plunger rod with the piston threaded through the plunger rod and engaged by a nut 44 at its upper end. The lower end of the leather washer 43 engages a washer 45 which is engaged by a threaded weight member 46 held in place by a nut 47.

A spring 47' engages the closure 30 and the piston 42 and aids the weight 46 to move the piston so that the valve is closed.

The upper end of the valve member 39 is provided with a valve seat 39′ having a ball valve 48 thereon, the upper movement of which is limited by a transverse pin 49.

The valve member 39 has a screen 39″ on its lower face. The stem 35 has a valve member 50 on its lower end adapted to coact with the valve seat 51 to control passage through the stem. The stem is provided with a lateral aperture 52 communicating with the interior of the cylinder.

My valve device is adapted to a large number of uses and the embodiment just described is particularly adapted for controlling the flow of water as, for instance, the water supplied to a sprinkler system.

When it is desired to employ my valve to shut off the sprinkler system after a certain period of flow and assuming that the parts are in the position shown in Fig. 1 and with the pipe 12 connected to service and the pipe 13 connected to the sprinkler system and assuming that the cylinder is filled with water above the piston 42.

The valve 28 is opened and the valves 21, 26, and 50 are closed.

The pressure against the piston raises the latter against the action of the weight 46 and against gravity with the water in the cylinder passing out through the valve 28. This action continues until the piston has reached the upper limits of its travel where it overlaps the opening 27.

The valve 28 is then closed. The valve 21 is opened as is the valve 26. The stem 35 is rotated so that the valve 50 is opened as desired.

The fluid from the inlet 12 then passes through the passageways 19, 18, and 20. Fluid also passes the valve 48 and the valve 50 and enters the cylinder through the aperture 52. This fluid exerts pressure on the upper surface of the piston 12 and balances the pressure on the lower surface of the piston so that the weight 46 and spring 47′ move the piston downwardly, carrying with it the valve 15 and associated parts. The movement continues depending on the degree the valves 21 and 50 are open until the top surface of the piston 42 clears the opening 25 whereupon additional fluid (depending upon the position of the valve 26) passes through the passageway 23 of the cylinder so that the piston movement is accelerated and the valve quickly closed. The valve 48 thus prevents passing of fluid into the outlet.

With my construction it will be apparent that the valve 26 need not be operated to open or closed position during the function of my device but may remain closed unless a quicker or slower closing action is desired. The valve 50 serves to secure greater control accuracy and when such accuracy is not desired this valve may remain closed without interfering with the function of my device. In practice I preferably fully open or fully close the valve 21 at each operation and depend on the valve 50 as a supplemental valve to determine the rate of fluid and thus accurately determine the time of closing of the valve 15.

In Fig. 2 I have shown a modification of my invention which is indicated generally at 60. As shown the device is particularly adapted to control the flow of viscous fluids, such as e. g., syrups, and wherein the fluid being controlled is too viscous to allow it to be used to operate the valve piston. The device 60 includes a fitting 61 which is threaded to receive an inlet pipe 62 and an outlet pipe 63. The fitting is provided with a valve seat 64 on which a valve 65 is seated.

The fitting 61 is threadedly connected to a valve member indicated generally at 66 as comprising a body 67 having a lower portion defining a chamber 67ª and an upper portion 67ᵇ which includes a cylinder 67′. The wall of the cylinder on one side includes a body portion 68 which has a passageway 68′ communicating at its lower end 69 with the interior of the cylinder and at the top communicating through a passageway 70 with the interior of the cylinder and through a passageway 70ª with a chamber 70ᵇ in the body. The flow of fluid through the passageways 68ª, 70, and 70ª is controlled by a valve 71 which may be suitably operated such as by inserting a screw driver in a slotted end 72.

At the lower end and opposite to the passageway 68′ the wall of the cylinder is provided with a passageway 73 the ends 74 of which communicate with the interior of the cylinder. A needle valve 76 serves to control the passage of fluid through the passageway 73. This passageway 73 is shorter than the passageway 68′. Opposite the passageway 70 I provide an aperture 77 in which a stopcock 78 is arranged to control the passage of fluid through the aperture.

The upper end of the cylinder is threaded as at 79 to receive a closure 80 on which a packing gland 81 is threaded. A hollow plunger rod 82 passes through the packing gland 81 and is provided with a threaded upper end 82 on which a hand wheel 83 is mounted. Beyond the hand wheel is a packing gland 84. The interior of the hollow plunger rod receives a stem 85 which includes a threaded portion 86 and engages with the threaded interior portion 87. The upper end of the stem 85 is provided with a knurled head 88.

The lower end of the stem 85 is tapered to provide a valve portion 88ª which engages a valve seat 88ᵇ. Just above the valve seat 88ᵇ the plunger rod has an aperture 88ᶜ therein which affords communication between the interior of the plunger rod and the interior of the cylinder 67. The valve seat 88ᵇ communicates through a passage 88ᵈ with a bore 88ᵉ in the plunger rod. Near its lower end the plunger rod extends through a packing gland 88ᶠ and below the gland 88ᶠ threadedly engages the valve 65 which is engaged by a nut 89 threaded on the plunger rod. A weight 89′ is threaded on the plunger rod above the nut 89.

The lower end of the valve 65 is engaged by a head 91 on an elongated rod 91ª which is fitted within the bore 88ᵉ in the plunger rod and has its upper end threaded into the bore. The rod 91ª includes a passageway 91ᵇ which communicates with the interior of the cylinder 67′ through an opening 91ᶜ in a nut 92 threaded on the plunger rod 82. The upper end of the passageway 91ᵇ includes a valve seat 91ᵈ on which a ball valve is seated.

A piston 93 is threaded on the plunger rod and a leather washer 94 surrounds the plunger rod and engages the piston. The lower face of the washer engages the nut 92 while the upper end of the piston 93 engages a nut 95 on the plunger rod.

Spaced from the chamber 70ᵇ the body 68 includes a pair of chambers 100 and 101 which are arranged one at each side of a recess 102.

A plunger 103 has one portion thereof positioned in the chamber 100 and another portion positioned in the chamber 101. The plunger 103 extends through suitable packing glands 104 at the inner ends of the chambers 100 and 101 to prevent leakage around the plunger.

Adjacent the plunger 103 I provide an operating arm 105 which is pivotally mounted intermediate its length on a shaft 106 which is supported by a bracket 107 integral with the body 68.

Intermediate its length the plunger 103 has an aperture 108 therethrough into which one end of the operating arm 105 extends. Within the plunger aperture 108 the arm 105 has a roller member 109 rotatably mounted thereon which is adapted to engage the upper and lower surfaces of the plunger aperture.

The upper end of the chamber 100 is closed by a threaded plug member 110 which includes a valve chamber 112 and an aperture 113 which at one end opens into the valve chamber 112 and at the opposite end opens into the chamber 100. Positioned in the valve chamber 112 I provide a spring pressed ball valve 114 which normally prevents passage from the valve chamber 112 through the aperture 113 into the chamber 100.

The plug member 110 has an aperture 115 therein which at one end opens into the valve chamber 112 and at the opposite end communicates with a conduit 116 in the body 68. The conduit 116 communicates with a vertical conduit 117 in the body 68 which in turn communicates with a horizontal conduit 118 which at one end communicates with the conduit 69.

The lower end of the chamber 101 is closed by an integral portion of the body 68 and has a valve chamber 119 therein and an aperture 120. One end of the aperture 120 opens into the chamber 101 and the opposite end opens into the valve chamber 119. Positioned in the valve chamber 119 I provide a spring pressed ball valve 121 which normally prevents passage from the valve chamber 119 through the aperture 120 into the chamber 101. Adjacent the valve chamber 119 the body 68 has a valve chamber 122 therein and an aperture 123 which at one end opens into the chamber 101 and at the opposite end opens into the valve chamber 122. The body 68 has a conduit 124 therein which at one end opens into the valve chamber 122 and at the opposite end opens into the chamber 70$^b$. Positioned in the valve chamber 122 I provide a ball valve 125 which normally prevents passage from the valve chamber 122 into the conduit 124.

The body 68 has a vertical conduit 126 therein which at the lower end communicates with the conduit 124 and at the upper end opens into a valve chamber 127. Positioned in the valve chamber 127 I provide a spring pressed ball valve 128 which normally prevents passage from the valve chamber 127 into the conduit 126.

The body has a horizontal conduit 129 therein which at one end opens into the chamber 100 and at the opposite end into the valve chamber 127.

In operation the chambers 67', 70$^b$ and 100 or 101 and the various conduits are filled with fluid such as oil, glycerine, etc. To operate the device 60 to an open position when the valve 65 engages the valve seat 64 the valves 76, 78, and 88 are closed and the valve 71 turned to the position shown in Fig. 2 to prevent passage from the conduits 68 and 70 into the chamber 67' and allow passageway from the chamber 67' through the conduits 70 and 70$^a$ into the chamber 70$^b$.

The operator then rocks the operating arm 105 which in turn reciprocates the plunger 103. As the plunger 103 moves into the chamber 100 the fluid therein is forced therefrom through the aperture 113, valve chamber 112 and conduits 116 and 117 into the conduit 118. When the plunger 103 moves into the chamber 101 the fluid therein is forced through aperture 120 and valve chamber 119 into the conduit 118 whence the fluid flows through the conduit 69 into the chamber 67' below the piston 93 and forces the piston 93 upward thereby moving the valve 65 out of engagement with the valve seat 64.

As the piston 93 moves upward the fluid in the chamber 67' above the piston 93 is forced out of the chamber 67' through the apertures 70 and 70$^a$ into the chamber 70$^b$ whence it passes through the conduit 124 either into and through the valve chamber 122 and the aperture 123 and into the chamber 101 as the plunger 103 moves outward or the fluid passes into and through the conduit 126, the valve chamber 127 and the conduit 129 into the chamber 100 when the plunger 103 moves outward therefrom.

To lower the piston and bring the valve 65 into engagement with its seat 64, the valve 76 is fully opened and the needle valve 88 opened a predetermined amount and the valve 71 turned to a position to allow passage between the conduits 70 and 68'. Or the valve 71 may be left in its former position depending upon the speed of action desired.

When the needle valve 88 is opened the weight 89', aided by a spring 130 which engages the piston 93 and the closure 80, forces the piston 93 downward which in turn forces the liquid in the chamber 67' below the piston therefrom through conduits 69 and 68' and past the valve 71 and through the conduit 70 into the chamber 67' above the piston 93.

Also fluid passes through the opening 91$^c$, passageway 91$^b$ and into the bore 88$^e$ whence it passes through the valve seat 88$^b$ and through the aperture 88$^c$ into the cylinder 67' at a rate which depends upon the position of the valve 88$^a$. Also, when the piston clears the upper aperture 74 fluid passes through this aperture to hasten the movement of the piston.

In Fig. 4 I have indicated a modified form of my valve device generally at 135. As shown the device 135 includes a body portion 136 having an open ended cylinder portion 137 therein. Each end of the cylinder portion is shown as closed by partitions 138. The partitions 138 engage flanges on the body 136 and on end members 139 and are secured to the body portion by bolts and nuts 140.

The end members 139 each include a pair of chamber members 141 and 142 which are separated by a partition 143 having an aperture 144 therein. A valve seat portion 145 surrounds each aperture 144. Positioned in the cylinder portion 137 I provide a pair of piston members 146 which include suitable packing material or piston rings 147 at the periphery to tightly engage the walls of the cylinder 137. Each of the pistons 146 has a rod 148 suitably secured thereto which extends out of the cylinder 137 through a suitable packing gland 149 on the partitions 138. Opposite each piston 146 the associated rod 148 has a valve member 150 thereon which is adapted to engage a valve seat 145 to restrict passage between each chamber 141 and 142 in the end members 139.

At one side of the cylinder 137 the body 136 has a valve recess 151 therein in which a valve member 152 is positioned. The valve member 152 may be operated in any desired manner. The body 136 has a conduit 153 therein which at one end opens into the cylinder 137 intermediate the length thereof and at the opposite end opens into the valve recess 151. Opposite the conduit 153 the body has a conduit 154 therein which at one end opens into the valve recess 151 and at the opposite end opens into the cylinder 137 at the side of one of the pistons.

The body 136 has another conduit 155 therein which at one end opens into the conduit 154 and at the opposite end opens into the cylinder 137 at the side of the other piston. Each of the end members 139 has a valve recess 156 and a conduit 157 therein. One end of the conduit 157 opens into the valve 156 and the opposite end opens into the valve 141. Positioned in the valve recess 156 I provide a spring pressed ball valve 157' which normally prevents passage from the valve recess 156 through the conduit 157 into the chamber 141. The body and the end members 139 have a conduit 158 which at one end communicates with one of the valve recesses 156 and at the opposite end communicates with the other valve recess 156. Adjacent the valve recess 151 the body 136 has a conduit 159 therein which at one end communicates with the conduit 158 and at the opposite end opens into the valve recess 151. As shown in the drawings the chambers 141 of the end members are adapted to communicate with a conduit 160 having fluid under pressure therein and the chambers 142 are adapted to communicate with the conduit 161.

The valve members 152 have a pair of grooves 162 and 163 therein and the construction is such that when the valve 152 is in one position the groove 162 at one end communicates with the conduit 154 and at the opposite end communicates with the conduit 159 and the valve slot 163 at one end communicates with a conduit 164 in the body 136. When the valve 152 is turned to another position the valve groove 162 at one end communicates with the conduit 153 and at the opposite end with the conduit 159 and the valve groove 163 at one end communicates with the conduit 154 and at the opposite end with the conduit 164.

When the pistons 146 at the extreme outer position and the valves 150 engage the valve seats 145 as shown in Fig. 4 and it is desired to move the valves 150 out of engagement with the valve seats 145 the valve 152 is turned to the position shown in Fig. 4 wherein the valve aperture 162 affords communication between the conduits 159 and 154.

When the valve 152 is in this position the fluid under pressure in the chambers 141 will flow through the conduits 157 past the ball valves 157' and into the conduit 158, thence through the conduit 159, the valve groove 162, into the conduits 154 and 155, and thence into the cylinder 137 on the side of the pistons 146 opposite the conduit 153.

As the fluid enters the cylinder 137 on the outside of pistons 146 it forces the pistons towards each other thereby moving the valves 150 out of engagement with the valve seats 145. As the pistons 146 move toward each other the fluid in the cylinder 137 between the pistons 146 passes out through the conduit 153, through the valve groove 163 and to the conduit 164. When it is desired to again move the valves 150 into engagement with the valve seats 145 the valve 152 is turned to a position wherein the valve aperture 163 at one end communicates with the conduit 154 and the opposite end communicates with the conduit 164 and the valve aperture 162 at one end communicates with the conduit 153 and at the opposite end communicates with the conduit 159. Fluid under pressure will then flow through the chambers 141 through the conduits 157 past the ball valves 157' into the conduit 158 thence into the conduit 159 and through the valve apertures 162 and through the conduit 153 into the cylinder 137 between the pistons 146 whereupon the pistons 146 will be moved outwardly until the valves 150 engage the valve seats 145.

In Fig. 10 I show an installation including the valve device 135 in which the outlets 161 communicate through pipes 170 with a tank 171 in which a float 172 is mounted on a guide 173. The float has a tube 174 thereon and an adjustable trip 175 which may be held on the tube 174 by a set screw 176. The tank includes a bracket 177 on which a lever 178 is pivoted. One end of the lever 178 is connected by a rod 179 with an arm 180 on the valve 152 while the other end of the lever 178 is in the path of movement of the trip 175.

Assuming that the lever 180 has just been manually moved to the position shown in Fig. 4 and that the valve 152 has just taken the position shown in this figure, fluid then flows through the conduits 154 and 155 into the cylinder to cause the pistons to move together and thus unseat the valves 150. At the same time fluid passes from the cylinder through the conduit 153.

This causes fluid to pass through the pipe 161 into the tank 173 thus causing the fluid 172 to rise and move the trip 175 upwardly. When the trip has been raised a sufficient distance it engages the free end of the lever 178 and rocks this lever over the center of its pivot so that the lever is pulled by a spring 181. The rocking of the lever 178 moves the rod 179 and moves the valve lever 180 to the position shown in Figs. 9 and 10. When the valve 152 is in this position fluid enters the cylinder 137 through the conduit 153 thus pushing the pistons 146 apart and closing the valves 150. It will be apparent that with this construction a single fluid control device may be made to automatically shut off a plurality of valves by fluid pressure exerted by the fluid passing through the control device.

From the foregoing description it will be apparent that I have invented a novel fluid control device which can be economically manufactured, which is simple in construction and operation and which is highly efficient in use.

Having thus described my invention I claim:

1. In a valve device, a body having an inlet and an outlet, a valve seat between said inlet and said outlet, a valve on said seat, a cylinder on said body, a piston in said cylinder, a plunger rod on said piston and connected to said valve, said cylinder having a conduit opening at each end into the cylinder, means for controlling passage of fluid through said conduit, said cylinder having another conduit communicating with the cylinder at spaced points, valve means to control the passage of fluid through said other conduit, said other conduit being independent of and shorter than said first conduit, and means to bleed said cylinder.

2. In a valve device, a body having an inlet and an outlet, a valve seat between said inlet and said outlet, a valve on said seat, a cylinder on said body, a piston in said cylinder, a plunger rod on said piston and connected to said valve, said cylinder having a conduit opening at each end into the cylinder, a valve for controlling passage of fluid through said conduit, said cylinder having another conduit communicating with the cylinder at spaced points, valve means to control the passage of fluid through said other conduit, said other conduit being disposed near one end of the cylinder and being independent of and shorter than said first conduit, said cylinder having an outlet to the atmosphere near the other end, and a valve for controlling passage through said aperture.

3. In a valve device, a body having an inlet and an outlet, a valve seat between said inlet and said outlet, a valve on said seat, a cylinder on said body, a piston in said cylinder, a plunger rod on said piston and connected to said valve, said cylinder having a passageway in one wall thereof, said passageway having an opening at each end into the cylinder, a valve for controlling passage of fluid through said passageway, said cylinder having a second passageway in the wall thereof, said second passageway communicating with said cylinder at spaced points, valve means to control the passage of fluid through said second passageway, said second passageway being disposed near one end of the cylinder and being independent of and shorter than said first passageway, said cylinder having an outlet to the atmosphere near the other end, a valve for controlling passage through said aperture, a washer on said plunger rod adjacent said piston and a weight member on said plunger rod below the piston.

4. In a valve device, a body having an inlet and an outlet, a valve seat between said inlet and said outlet, a valve on said seat, a cylinder on said body, a piston in said cylinder, a plunger rod on said piston and connected to said valve, said cylinder having a conduit opening at each end into the cylinder, a valve for controlling passage of fluid through said conduit, said plunger rod being hollow and communicating at one end with said body, said plunger rod having an outlet therein communicating with the interior of said cylinder above the piston, a stem in said plunger rod and having a valve portion at its lower end, a valve seat in said plunger rod arranged to cooperate with said valve stem and disposed between the lower end of said plunger rod and the outlet in said plunger rod, a weight member on said plunger rod below the piston, said plunger rod having a second valve seat therein and a one way valve in said seat, said valve being disposed to allow fluid to pass into said plunger rod and to prevent passage of fluid from the plunger rod.

5. In a valve device, a body having an inlet and an outlet, a valve seat between said inlet and said outlet, a valve on said seat, a cylinder on said body, a piston in said cylinder, a plunger rod on said piston and connected to said valve, said cylinder having a conduit opening at each end into the cylinder, a valve for controlling passage of fluid through said conduit, said cylinder having an outlet to the atmosphere, a valve for controlling passage through said outlet, said plunger rod being hollow and communicating at one end with said body, said plunger rod having an outlet therein communicating with the interior of said cylinder above the piston, a stem in said plunger rod and having a valve portion at its lower end, a valve seat in said plunger rod arranged to cooperate with said valve stem and disposed between the lower end of said plunger rod and the outlet in said plunger rod, a washer on said plunger rod adjacent said piston, a weight member on said plunger rod below the piston, said plunger rod having a second valve seat therein and a one way valve in said seat, said valve being disposed to allow fluid to pass into said plunger rod and to prevent passage of fluid from the plunger rod.

6. In a valve device, a body having an inlet and an outlet, a valve seat between said inlet and said outlet, a valve on said seat, a cylinder on said body, a piston in said cylinder, a plunger rod on said piston and connected to said valve, said cylinder having a conduit opening at each end into the cylinder, a valve for controlling passage of fluid through said conduit, said cylinder having another conduit communicating with the cylinder at spaced points, valve means to control the passage of fluid through said other conduit, said second passageway being disposed near one end of the cylinder and being independent of and shorter than said first passageway, said cylinder having an outlet to the atmosphere near the other end, a valve for controlling passage through said outlet, said plunger rod being hollow and communicating at one end with said body, said plunger rod having an outlet therein communicating with the interior of said cylinder above the piston, means to control passage of fluid through said outlet, and means to allow fluid to pass into said plunger rod and to prevent passage of fluid from the plunger rod.

7. In a valve device, a body having an inlet and an outlet, a valve seat between said inlet and said outlet, a valve on said seat, a cylinder on said body, a piston in said cylinder, a plunger rod on said piston and connected to said valve, said cylinder having a conduit opening at each end into the cylinder, a valve for controlling passage of fluid through said conduit, said cylinder having another conduit communicating with the cylinder at spaced points, valve means to control the passage of fluid through said other conduit, said other conduit being disposed near one end of the cylinder and being independent of and shorter than said first conduit, said cylinder having an outlet to the atmosphere near the other end, a valve for controlling passage through said outlet, said plunger rod being hollow and communicating at one end with said body, said plunger rod having an outlet therein communicating with the interior of said cylinder above the piston, a stem in said plunger rod and having a valve portion at its lower end, a valve seat in said plunger rod arranged to cooperate with said valve stem and disposed between the lower end of said plunger rod and the outlet in said plunger rod, and means to allow fluid to pass into said plunger rod and to prevent passage of fluid from the plunger rod.

8. In a valve device, a body having an inlet and an outlet, a valve seat between said inlet and said outlet, a valve on said seat, a cylinder on said body, a piston in said cylinder, a plunger rod on said piston and connected to said valve, said cylinder having a passageway in one wall thereof, said passageway having an opening at each end of the cylinder, a valve for controlling passage of fluid through said passageway, said cylinder having a second passageway in the wall thereof, said second passageway communicating with said cylinder at spaced points, valve means to control the passage of fluid through said second passageway, said second passageway being disposed near one end of the cylinder and being independent of and shorter than said first passageway, said cylinder having an outlet to the atmosphere near the other end, a valve for controlling passage through said outlet, said plunger rod being hollow and communicating at one end with said body, said plunger rod having an outlet therein communicating with the interior of said cylinder above the piston, a stem in said plunger rod and having a valve portion at its lower end, a valve seat in said plunger rod arranged to cooperate with said valve stem and disposed between the lower end of said plunger rod and the outlet in said plunger rod, a washer on said plunger rod adjacent said piston, a weight member on said plunger rod below the piston, said plunger rod having a second valve seat therein and a one way valve in said seat, said valve being disposed to allow fluid to pass into said plunger rod and to prevent passage of fluid from the plunger rod.

9. In a valve device, a body having an inlet and an outlet, a valve seat between said inlet and said outlet, a valve on said seat, a cylinder on said body, a piston in said cylinder, a plunger rod on said piston and connected to said valve, said cylinder having a passageway in one wall thereof, said passageway having an opening at each end of the cylinder, a valve on said plunger rod for controlling passage of fluid through said passageway, said cylinder having a second passageway in the wall thereof, said second passageway communicating with said cylinder at spaced points, valve means to control the passage of fluid through said second passageway, said second passageway being disposed near one end of the cylinder and being independent of and shorter than said first passageway, said cylinder having an outlet to the atmosphere near the other end, a valve for controlling passage through said outlet, said plunger rod being hollow and communicating at one end with said body, said plunger rod having an outlet therein communicating with the interior of said cylinder above the piston, a stem in said plunger rod and having a valve portion at its lower end, a valve seat in said plunger rod arranged to cooperate with said stem and disposed between the lower end of said plunger rod and the outlet in said plunger rod, a washer on said plunger rod adjacent said piston, a weight member on said plunger rod below the piston, said plunger rod having a second valve seat therein and a one way valve in said seat, said valve being disposed to allow fluid to pass into said plunger rod and to prevent passage of fluid from the plunger rod.

10. In a valve device, a body having an inlet and an outlet, a valve seat between said inlet and said outlet, a valve on said seat, a cylinder on said body, a piston in said cylinder, a plunger rod on said piston and connected to said valve, said cylinder having a conduit communicating with each end of the cylinder, means for controlling passage of fluid through said conduit, said cylinder having another conduit communicating with the cylinder at spaced points, valve means to control the passage of fluid through said other conduit, said other conduit being independent of said first conduit, and means to bleed said cylinder.

11. In a valve device, a body having an inlet and an outlet, a valve seat including a port directly communicating with the inlet and outlet, a cylinder having its lower end open and communicating directly with the inlet, a piston slidable in said cylinder, a piston rod on said piston, a valve on said rod and movable with the piston towards and from the valve seat, valve controlled conduit means opening into the cylinder below the lower position of the piston and also opening into the cylinder above the upper position of the piston to afford communication between the inlet and the upper portion of the cylinder whereby the pressure on the two sides of the piston is balanced, a valve controlled means in the path of the piston when at its upper position to bleed the cylinder, spring means to urge the piston towards its seat and adjustable means independent of all of said previously mentioned means to afford communication between the inlet and the upper side of the piston.

HARRY J. McCOMBS BURDICK.